United States Patent
Bultan et al.

(10) Patent No.: US 7,206,335 B2
(45) Date of Patent: Apr. 17, 2007

(54) OPTIMUM INTERPOLATOR METHOD AND APPARATUS FOR DIGITAL TIMING ADJUSTMENT

(75) Inventors: Aykut Bultan, Bayside, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 694 days.

(21) Appl. No.: 10/676,152

(22) Filed: Sep. 29, 2003

(65) Prior Publication Data

US 2004/0120387 A1   Jun. 24, 2004

Related U.S. Application Data

(60) Provisional application No. 60/415,682, filed on Oct. 2, 2002.

(51) Int. Cl.
*H04L 27/30* (2006.01)
(52) U.S. Cl. .................... 375/148; 375/149; 375/150; 375/343
(58) Field of Classification Search ........ 375/142–145, 375/148–150, 152, 343; 370/320, 335, 342, 370/441
See application file for complete search history.

(56) References Cited

U.S. PATENT DOCUMENTS

| 6,313,885 | B1 | 11/2001 | Patel et al. | |
|---|---|---|---|---|
| 6,483,867 | B1 * | 11/2002 | Mannermaa | 375/149 |
| 6,633,255 | B2 * | 10/2003 | Krasner | 342/357.12 |
| 7,027,486 | B2 * | 4/2006 | Sullivan | 375/147 |

FOREIGN PATENT DOCUMENTS

| EP | 1 204 215 | 5/2002 |
|---|---|---|
| KR | 2001-0010342 | 2/2001 |
| KR | 2002-0052440 | 7/2002 |

OTHER PUBLICATIONS

A.V. Oppenheim, "Digital Signal Processing," 1975, Prentice Hall, New Jersey.

(Continued)

*Primary Examiner*—Dac V. Ha
(74) *Attorney, Agent, or Firm*—Volpe and Koenig, P.C.

(57) ABSTRACT

A digital timing synchronizer of a receiver is provided for timing synchronization to a transmitter in a wireless communication system, wherein the received signal has a timing error with respect to a reference code. A channel estimator estimates an initial code phase of the received signal. A code generator generates a timing reference code that is adjustable by integer increments. An interpolation feedback circuit is configured for interpolation and correction of the timing error, whereby the interpolation is achieved through an integer code shift, plus a quantized fractional adjustment selected from a look-up table of quantized fractional adjustment values and their associated predetermined interpolator coefficients, from which a time corrected version of the received signal is produced.

16 Claims, 2 Drawing Sheets

OTHER PUBLICATIONS

R.E. Crochiere et al., "Multirate Digital Signal Processing," 1983, Prentice Hall, New Jersey.

H. Meyr et al., "Digital Communication Receivers," A Wiley-Interscience Publication, 1998, John Wiley and Sons, New York.

F.M. Garner, "Interpolation in Digital Modems—Part I: Fundamentals," IEEE Transactions on Communications, vol. 41, No. 3, Mar. 1993, pp. 501-507.

L. Erup et al., "Interpolation in Digital Modems—Part II: Implementation and Performance," IEEE Transactions On Communications, vol. 41, No. 6, Jun. 1993, pp. 998-1008.

F.M. Garner, "Interpolation in Digital Modems —Part I: Fundamentals, " IEEE Transactions on Communications, vol. 41, No. 3, Mar 1993, pp. 501-507.

L. Erup et al., "Interpolation in Digital Modems —Part II: Implementation and Performance," IEEE Transactions On Communications, vol. 41, No. 6, Jun. 1993, pp. 998-1008.

Wu, Yik-Chung et al. "FPGA Implementation of Digital Timing Recovery in Software Radio Receiver", Circuits and Systems, 2000. IEEE APCCAS 2000. The 2000 IEEE Asia-Pacific Conference on Dec. 4-6, 2000, Piscataway, NJ USA, IEEE, pp. 703-707.

R.e.Crochiere et al., "Multirate Digital Signal Processing," 1983, Prentice Hall, New Jersey.

H. Myer et al., "Digital Communication Receivers, " A Wiley-Interscience Publication, 1998, John wiley and Sons, New York.

\* cited by examiner

OPTIMUM INTERPOLATOR METHOD AND APPARATUS FOR DIGITAL TIMING ADJUSTMENT

CROSS REFERENCE TO RELATED APPLICATION(S)

This application claims priority from U.S. Provisional Application No. 60/415,682 filed on Oct. 2, 2002, which is incorporated by reference as if fully set forth herein.

FIELD OF INVENTION

This invention generally relates to digital timing synchronizers, and more particularly to an efficient implementation of an interpolator to be used in digital timing synchronizers.

BACKGROUND

Hereafter, a wireless transmit/receive unit (WTRU) includes, but is not limited to, a user equipment, mobile station fixed or mobile subscriber unit, pager, or any other type of device capable of operating in a wireless environment. When referred to hereafter, a base station includes, but is not limited to, a base station, Node B, site controller, access point or other interfacing device in a wireless environment.

In a wireless frequency division duplex (FDD) or time division duplex (TDD) telecommunication system, timing synchronization between transmitted and received signals of a base station and a WTRU is imperative for proper two way communication. Also, Doppler effect may contribute to the frequency difference if the mobile receiver is in motion. To counteract the timing difference between the base station local oscillator and the WTRU local oscillator, a simple adjustment to the WTRU receiver local oscillator can correct the error by applying an advance or delay to the sampling rate accordingly, if there is no multipath processing in the receiver. However, due to multipath signal effects, conventional receivers of wireless communication systems employ means for detection of the multipath signals and means for reconstructing the transmitted signal, such as the RAKE type receivers.

The timing for each path is estimated in two stages. First, a channel estimator is used to find the approximate locations of each path in time for a multi-path communication channel. Second, for each path, a dedicated code tracker used in correlation to each RAKE finger finds the accurate location of the path in time and tracks it continuously thereafter. Since each path has a unique time location, controlling the code timing through the local oscillator alone does not correct the timing error in a multipath channel environment.

To address the multipath problem, code trackers may use interpolators to perform digital timing synchronization instead of controlling the local oscillator. For the efficient implementation of an interpolator, a finite impulse response (FIR) interpolator may be used. There are different known approaches for FIR interpolators. The simplest approach is to use a truncated sin c function as an FIR interpolator. Another option is to use a polynomial interpolator. Also, a minimum mean square error (MMSE) interpolator can be used. Among all of these algorithms, an MMSE interpolator provides the minimum error compared to the infinite length ideal interpolator. It is to be noted that without an efficient interpolator control unit that ensures that the interpolator is centralized with respect to the main lobe of the sin c function (i.e., centralized with respect to the interpolating function), the interpolator might result in a higher number of FIR coefficients than may be necessary for a given accuracy. The drawback to excessive coefficients is that the number of interpolation computations becomes cumbersome, and at some point, a limiting factor for the implementation. This is especially compounded as the number of trackers employed increases in order to more effectively contend with multipath effects. Thus, a tradeoff exists between extending the number of RAKE finger trackers versus the amount of time diversity gain obtained from a multi-path channel.

SUMMARY

A digital timing synchronizer of a receiver is provided for timing synchronization to a transmitter in a wireless communication system, wherein the received signal has a timing error with respect to a reference code. A channel estimator estimates an initial code phase of the received signal. A code generator generates a timing reference code that is adjustable by integer increments. An interpolation feedback circuit is configured for interpolation and correction of the timing error, whereby the interpolation is achieved through an integer code shift, plus a quantized fractional delay estimate selected from a look-up table of quantized values of fractional delay estimates associated with predetermined interpolator coefficients, from which a time corrected version of the received signal is produced.

Within the interpolation feedback circuit, an interpolator normalized to a sampling rate is configured to shift the received signal in time by a fractional delay or advancement. A timing error estimator determines a timing error estimate based on the timing difference between an output signal of the interpolation feedback circuit and the timing reference code of the code generator. An interpolator controller, responsive to the timing error estimate, produces and sends an integer code shift signal to the code generator in a direction opposite of the timing error estimate, and produces a fractional delay estimate, whereby the interpolation is controlled by maintaining fractional delay estimate within a predetermined range. A quantizer, having the look-up table with stored predetermined interpolator coefficients associated with quantized fractional delay estimate values, selects a quantized fractional delay estimate that is closest in value to the fractional delay estimate. The interpolator processes the coefficients associated with the quantized fractional delay estimate.

BRIEF DESCRIPTION OF THE DRAWING(S)

A more detailed understanding of the invention may be had from the following description of a preferred embodiment, given by way of example and to be understood in conjunction with the accompanying drawings in which.

DETAILED DESCRIPTION OF THE PREFERRED EMBODIMENT(S)

Although the embodiments are described in conjunction with a third generation partnership program (3GPP) wideband code division multiple access (W-CDMA) system utilizing the time division duplex mode, the embodiments are applicable to any hybrid code division multiple access (CDMA)/time division multiple access (TDMA) communication system. Additionally, the embodiments are applicable to CDMA systems, in general, such as the proposed frequency division duplex (FDD) mode of 3GPP W-CDMA.

Figure 1:
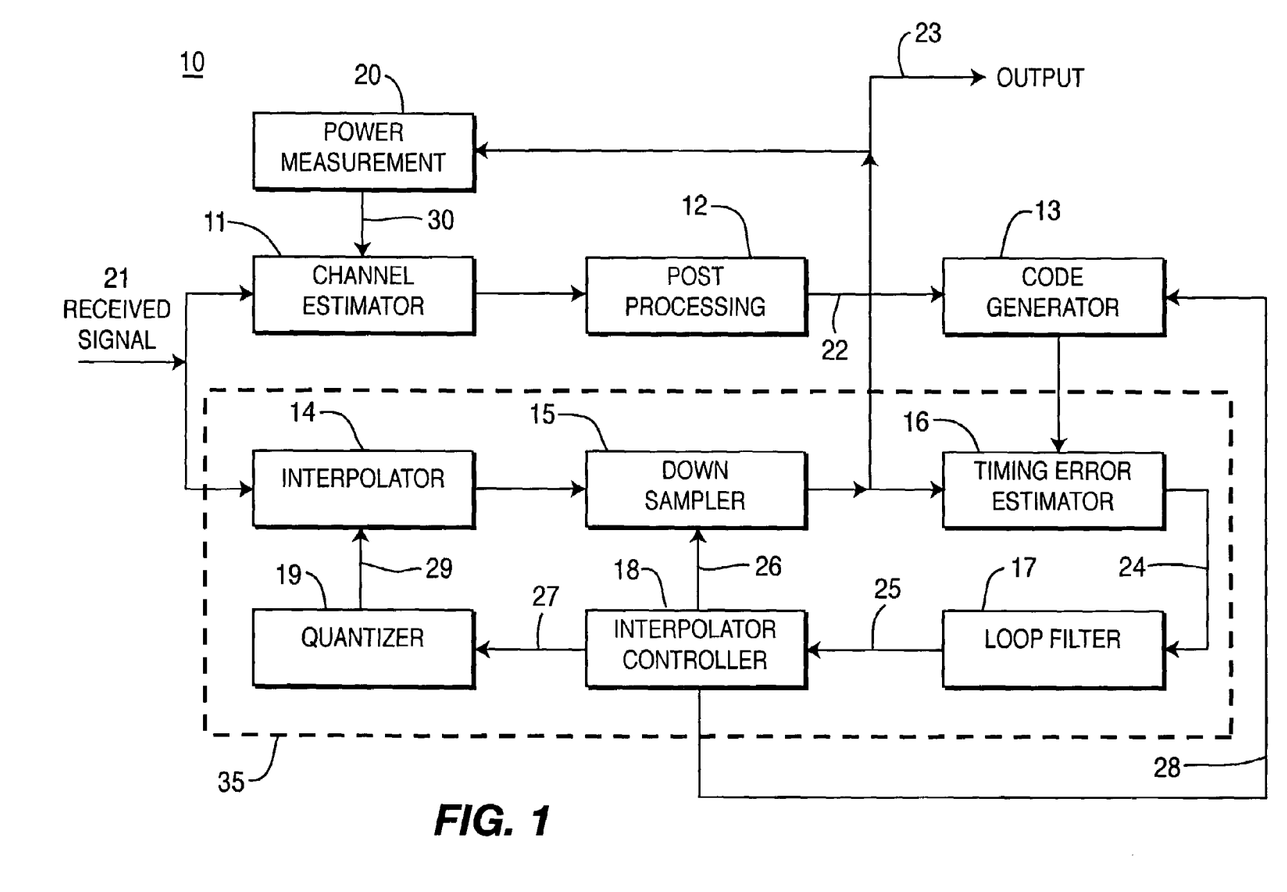
FIG. 1 shows a block diagram of a code tracker with optimized interpolation.

FIG. 1 shows a block diagram of the preferred embodiment of a code tracker 10, comprising channel estimator 11, post processing unit 12, code generator 13, interpolator 14, down-sampler 15, timing error estimator 16, loop filter 17, interpolator control 18, quantizer 19, and power measurement 20. A received signal 21 becomes an input signal to both the channel estimator 11 and the interpolator 14. Code tracker 10 performs digital timing synchronization of a receiver to a corresponding wireless transmitter. In a 3GPP-like system for example, code tracker 10 is within a mobile WTRU receiver for digital timing synchronization with a base station transmitter.

Channel estimator 11 coarsely estimates the initial code phase of input signal 21, i.e., the code locations in time. One method for estimating the channel estimate includes, but is not limited to, using a sliding window correlators. The sample period of the channel estimator 11 should be less than or equal to $2T_c$, where $T_c$ is the duration of one chip period. For example, if an early-late gate synchronizer is used for timing error estimator 16, then the initial timing error estimate should be confined to a range $-T_c$ to $T_c$. Otherwise, the timing error may be out of range and the algorithm may fail to operate. However, this invention is not limited to early-late gate synchronizer and any other timing error estimator 16 may be used. In the latter case, a different sample period for the channel estimator can be used. By using a channel estimator 11 with a sample period that is less than $2T_c$, the initial error in the path location is limited to the range $-T_c$ to $T_c$.

Post-processing unit 12 estimates the signal and noise power against a noise threshold. After the post-processing is completed, all the paths that have the power level above the noise threshold are identified. Location of these strong paths in time is called the initial code phase 22. Either the strongest one of these paths may be used alone, or a set of paths above a certain threshold may be used as in a RAKE-like receiver structure. A RAKE-like receiver is very useful in a multipath channel environment since it makes efficient usage of the time diversity of the channel.

In the case having a selected strongest path, there is only one code tracker 10, including one interpolator 14 and one interpolator control 18. For a RAKE-like receiver, there should be one code tracker 10 dedicated to each path used. In that case, however, the channel estimator 11 and the post-processing unit 12 will be common to all the code trackers used. By applying the initial code phase 22 for a single path from the post-processing unit 12 to the code generator 13, the timing synchronization begins.

For each code tracker 10 of a RAKE-like receiver, a code generator 13 produces a reference code for the basic timing, functioning as a clock. Initial code phase 22 adjusts the initial timing offset of the code generator 13 in multiples of chips by simply advancing or delaying in time the reference code being generated. After the initial correction is completed, the code generator 13 is only controlled by the code shift command 28 coming from the interpolator control 18. The initial code phase 22 is only being applied under two circumstances: the first time the receiver is activated, and anytime the signal power drops below a noise threshold. Code shift 28 is a shift command of one chip generated by the interpolator controller 18 in either an advance or delay direction. After the initial correction is completed, the worst-case timing error estimate is confined to a period range of $-T_c$ to $T_c$.

The interpolation feedback loop 35 of code tracker 10, comprising interpolator 14, down-sampler 15, timing error estimator 16, loop filter 17, interpolator controller 18, and quantizer 19, will now be explained in detail. Interpolation feedback loop 35 drives the timing error estimate signal 24 to a value close to zero, and drives the delay estimate 25 towards the actual delay duration.

Interpolator 14 shifts the received signal in time mathematically with an amount equal to the quantized fractional delay estimate 29, received from quantizer 19. The output signal from an ideal interpolator is represented by Equation 1:

$$y(n) = x(n+\hat{\alpha}) \sum_{m=-\infty}^{\infty} x(n-m) Sinc(m+\hat{\alpha}),$$
Equation 1 where n is an integer time index, x(n) is the over-sampled received signal 21, $\hat{\alpha}$ represents the quantized fractional delay estimate 29, and the Sin c function is defined as:

$$Sinc(x) = \frac{\sin(nx)}{nx}.$$
Equation 2

For the initial iteration through interpolation feedback loop 35, quantized fractional delay estimate 29 is reset to zero, which results in the received signal passing through the interpolator 14 unmodified. Regarding operation of interpolator 14 and formulation the quantized fractional delay estimate 29 (i.e., value $\hat{\alpha}$), a description in further detail will follow in reference to the second and beyond iterations of interpolation feedback loop 35.

Down-sampler 15 reduces the over-sampling rate of the received signal 21 by an over-sampling factor of L after it has been processed by interpolator 14. Code tracker 10 with interpolator 14 can be applied to a receiver that operates at a sampling rate of any integer value of L greater than or equal to one. The optimum range for sampling rate to which code tracker 10 can perform timing adjustment is $1 \leq L \leq 8$. The case L=1 corresponds to no over-sampling. If, on the other hand, the sampling rate correlates to an integer $L \geq 8$, the timing error reduces to a value on the order of $\frac{1}{16}T_c$, whereby the contribution of interpolator unit 14 is significantly reduced and a simple sample shift through the down-sampler 15 begins to be sufficient on its own. However, as high over-sampling rates such as $L \geq 8$ results in extra power consumption of receiver resources, it is advantageous to operate at lower sampling rates and perform code tracking with code tracker 10 according to FIG. 1.

Down-sampler 15 converts the sampling rate to the chip rate, such that at the output of down-sampler 15, the sampling rate period $T_s$ equals the chip rate period $T_c$. Therefore, the output of the down-sampler 15 can be represented by z(n) as follows:

$$z(n)=y(L \cdot n+k)$$
Equation 3 where k is an integer representing the base point 26 of the down-sampler 15. For example, for an over-sampled signal with sampling rate factor L=4, the period of the sampling rate prior to down-sampler 15 is $T_s=T_c/L=T_c/4$, while after the down-sampling, it is $T_s=T_c$. Initially, the base point 26 is reset to zero. The derivation of value k will be explained later in reference to Equations 6a, 6b.

The output of down-sampler 15 is the time corrected output signal 23 to be further processed by the WTRU receiver. Power measurement unit 20 processes the output 23 and sends the power measurements of the signal to channel estimator 11 as an input for locating the approximate locations of each path in time for the multipath channel. For timing refinement, the output 23 of down-sampler 15 also continues through interpolation feedback loop 35 of code tracker 10, to timing error estimator 16, where the timing error of the input signal is measured and sent as timing error estimate 24. Timing error estimator 16 can operate according to a variety of known timing error estimation algorithms. The preferred embodiment employs an early-late gate synchronizer.

Next, a loop filter 17 receives timing error estimate 24 to produce a delay estimate 25. The selection of the type of loop filter 17 depends on the channel conditions. However, the invention is not limited to the particular loop filter being used. Preferably, loop filter 17 is a first or second order filter. As an example, a known proportional integrator (PI) filter is used as loop filter 17. Alternatively, a first order auto regressive (AR) filter is be used as loop filter 17.

Figure 2:
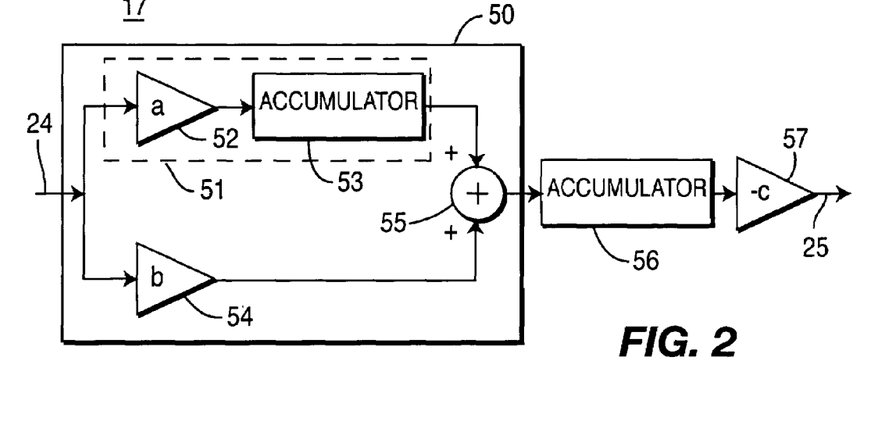
FIG. 2 shows a block diagram of a loop filter.

FIG. 2 shows a preferable configuration for loop filter 17, comprising a second order PI filter 50, accumulator 56, and inverted multiplier 57. PI filter 50 comprises integrator 51, which includes multiplier 52 and accumulator 53, multiplier 54 and adder 55. Multipliers 52 and 54 apply constants a and b, respectively to the timing error estimate 24 input, which is split at the input of PI filter 50. The timing error estimate 24 input is integrated by integrator 51, while multiplied by constant b in parallel with the integrator 51. The parallel outputs are summed by adder 55 to produce the PI filter output. Next, the PI filter output is accumulated by accumulator 56 and processed by multiplier 57 with a constant −c. The sign reversal of constant c in multiplier 57 results in the timing correction in the opposite direction to compensate for the timing error estimate 24 in the signal, useful for a negative feedback system such as shown in FIG. 1. Depending on the order of the loop filter 17, the code tracker 10 can include a first, second or even higher order feedback loop. The output of multiplier 57 is delay estimate 25.

The output delay estimate 25 of loop filter 17 is represented by $T_d$ as follows:

$$T_d = \Im(T_e), \qquad \text{Equation 4}$$

where $T_e$ is the timing error estimate 24 from the timing error estimator 16, and $\Im(.)$ is a linear operator. The delay estimate 25 is passed to the interpolator control 18 for further processing.

Interpolator controller 18 serves two main functions: regulating delay estimate 25 range and minimizing interpolator coefficients. First, with respect to keeping the delay estimate 25 within the operating range for the rate of the code tracker 10, the operating range depends on the particular selection of the timing error estimator 16. For example, for an early-late gate synchronizer type timing error estimator 16, the operating range sampling period is limited to $-T_c$ to $T_c$. There are two ways of limiting the signal timing deviation to the working range of the timing error estimator 16. First, this can be achieved by shifting the base point 26 of the down-sampler 15 in time proportional to the delay estimate 25. However, this corresponds to changing the beginning of the frame for the whole receiver. It is only realizable if there is only one direct transmission path to the receiver. However, in a multi-path environment, it is preferable to shift the code generator 13, of the code tracker 10 dedicated to the path of concern, in the opposite direction of the delay estimate 25.

Independent of the timing error estimator 16 implementation, the timing error estimate 24 of the received signal 21 is measured with respect to the reference code in the receiver, which is produced by code generator 13. Interpolator control 18 monitors the delay estimate 25 and whenever it is outside of a certain range, it shifts the code generator 13 in the opposite direction. Since the code generator 13 is working at a chip rate with period $T_c$, the minimum amount of shift is equal to the chip duration, i.e., $T_c$. Therefore, it is preferable to perform a code shift 28 whenever delay estimate 25 becomes $T_d > T_c/2$ or $T_d < -T_c/2$.

In actual communication system implementations, the relative delay of the path between the base station and the mobile WTRU receiver may change over time. Mainly, this may occur for the following reasons. First, the motion of a mobile WTRU receiver can result in a change of the delay estimate 25 in time. For a mobile WTRU receiver moving with a constant speed, there is a first order change in the timing error. A second reason is the local oscillator frequency differences between a base station and a mobile WTRU receiver. This also results in a first order change in the delay estimate 25. Both of these effects are cumulative. However, the timing error changes are not limited to first order changes. For code tracker 10 having N order changes, interpolator controller 18 is able to follow N−1 order changes if necessary, and performs code shifts whenever necessary.

Figure 3A:
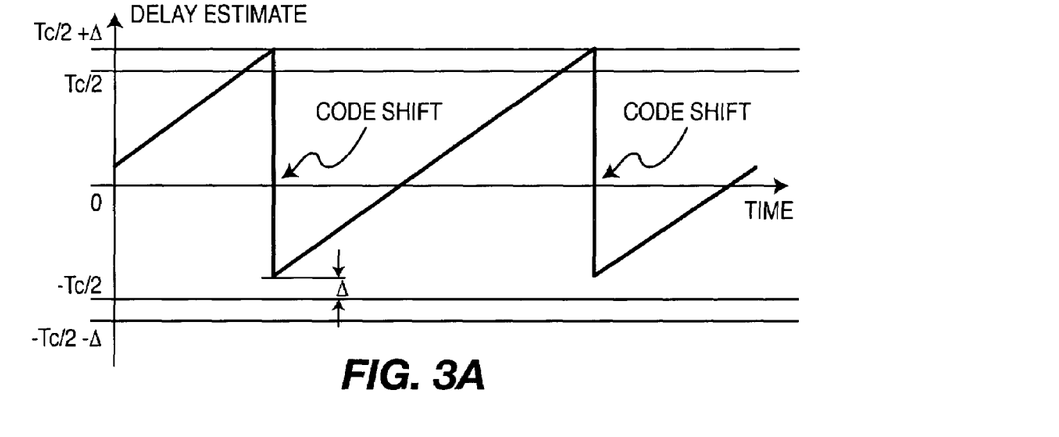
FIGS. 3A, 3B show timing diagrams of code shifting of the code tracker.
Figure 3B:
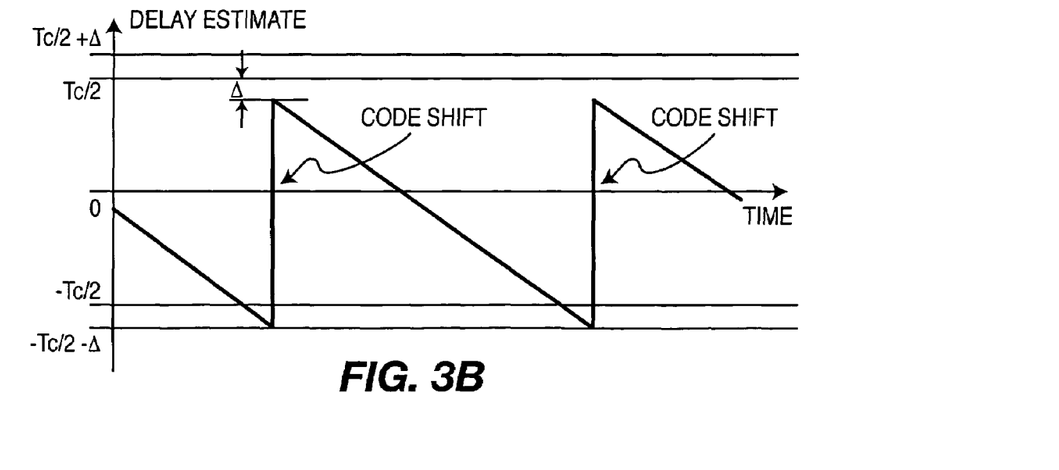

The code shift decisions by code tracker 10 are robust, notwithstanding low signal-to-noise ratio (SNR) and fading channel conditions. To eliminate the oscillating code shift operations due to noise and interference, simple hysteresis logic is employed. Timing diagrams of the delay estimate 25 change with respect to oscillator drift and a constant speed mobile WTRU motion are shown in FIGS. 3A and 3B. The time shifts result in saw-tooth waveform structure due to periodic time shifts for a linearly changing time delay. As shown in FIG. 3A, delay estimate 25 is linearly increasing. The peak transitions occur at a code shift 28, where at peak $T_c/2+\Delta$, code shift 28 is implemented in a negative direction to compensate for the increasing delay estimate 25. Conversely, in FIG. 3B, a linearly decreasing delay estimate 25 is compensated by a positive code shift 28. Although a linear change of time delay 25 is depicted in FIGS. 3A and 3B, it should be noted that code tracker 10 is not restricted to linear changes in delay estimate 25, but will work for any kind of change in the delay estimate 25 updates. The code shift 28 takes place in both directions, either with delay or advance as before explained. As shown in FIGS. 3A and 3B, an arbitrary small value of $\Delta$ (e.g., $0.05T_c$) is used to prevent oscillatory behavior around the code shift 25 points.

After the code shift 28 occurs, the new delay estimate value 25 that is used by the interpolator controller 18 is found as follows:

$$\tilde{T}_d = T_d - T_c \operatorname{sgn}[T_d], \qquad \text{Equation 5a}$$

where sgn [.] indicates the direction of code shift 28 (i.e., positive, negative, or none) and is defined as:

$$sgn[T_d] = \begin{cases} 1, & T_d \geq T_c/2 + \Delta \\ 0, & -T_c/2 - \Delta < T_d < T_c/2 + \Delta \\ -1, & T_d \leq -T_c/2 - \Delta \end{cases} \quad \text{Equation 5b}$$

Regarding the second function of interpolator controller 18 to minimize coefficients, the actual interpolation with finite size is optimized to achieve minimum error. Recall that the ideal interpolator in Equation 1 has infinite number of coefficients and as such is not realizable in an implementation. The optimum interpolator coefficients for a finite size interpolator are obtained through an optimization algorithm, such as MMSE, to minimize the approximation error. This is described in the following paragraphs in detail. However, the approximation error due to a finite size interpolator can be further reduced by minimizing the fractional delay estimate 27 as much as possible. Interpolator controller 18 is therefore configured to achieve this. The delay estimate 25 after code shift processing can be written as $$\tilde{T}_d = k \cdot T_s + \alpha \cdot T_s, \quad \text{Equation 6a}$$

where k is defined as follows:

$$k = \left\lfloor \frac{\tilde{T}_d}{T_s} \right\rfloor. \quad \text{Equation 6b}$$

The operation $\lfloor x \rfloor$ represents the largest integer in x. The value of k corresponds to the number of over-sampled sample durations that exist in $\tilde{T}_d$. Therefore, a delay or advance of $k \cdot T_s$ corresponds to a simple shift of the over-sampled input signal by an amount equal to k samples. This shift is easily achieved by shifting the base point 26 of the down-sampler by an integer k as shown in Equation 3. After the base point 26 shift, the remaining time shift left is equal to $$T'_d = \tilde{T}_d - k \cdot T_s = \alpha \cdot T_s. \quad \text{Equation 7}$$

Since the interpolator 14 is normalized to the sampling rate of $T_s$, the value that goes to interpolator 14 is the fractional delay estimate 27 after it is quantized (i.e., $\hat{\alpha}$). Also, it is important to note that after decomposing delay estimate 25 (i.e., value $\tilde{T}_d$ in Equation 6a and value k in Equation 6b), fractional delay estimate 27 is limited to the range $-1 < \alpha < 1$. This limiting of the range keeps fractional delay estimate 27 minimal and achieves the desired decreased interpolation error.

To illustrate the operation of the interpolator controller 18, the following example is presented. Assume that the filtered timing error estimate 25 is $T_d = 0.64 T_c$ and the over-sampling rate is L=4. Therefore, the sampling rate is $T_s = T_c/L = T_c/4$. According to Equations 5a and 5b, code shift 28 is required, and so the code shifted delay estimate 25 is $\tilde{T}_d = 0.64 T_c - T_c = -0.36 T_c$. From Equation 6b, base point 26 is k=−1 and from Equation 6a, the fractional delay estimate 27 is $\alpha = -0.44$.

Quantizer 19 is the last remaining stage of interpolation feedback loop 35. The fractional delay estimate 27 is quantized (i.e., discretized) by the quantizer 19 before being used by the interpolator. Quantizer 19 is useful for limiting computation of the interpolator coefficients to avoid the computation each time the delay estimate 25 is updated.

Quantizer 19 comprises a look-up table for storing pre-calculated interpolator coefficients that correlate to a set of available quantized fractional delay estimate values. This look-up table decreases the computational complexity of the interpolation and also increases the processing speed. Quantizer 19 determines a number of levels for quantizing the fractional delay estimate based on the required timing accuracy and the over-sampling rate L. The required timing accuracy for timing adjustment is $T_c/Q$, where Q is a positive integer. It follows that the quantization step size needed is $2T_c/Q$. For the over-sampling rate of L, this corresponds to Q/L quantization levels for the range $-1 < \alpha < 1$. For example, for Q=32 and L=4, the required timing accuracy for timing adjustment is $T_c/16$, and the quantizer 19 has Q/L=8 levels. Then if fractional delay estimate 27 is $\alpha = -0.44$ according to the above example, the quantized delay would be determined from selecting the nearest equivalent value from the lookup table in quantizer 19. Since this is a level 8 quantizer, the available values are from the following set of quantized fractional delay estimates: [−1, −0.75, −0.5, −0.25, 0.25, 0.5, 0.75, 1] (value 0 is not used as it results in no interpolation at all). Since −0.44 is closest to −0.5, the selected quantized fractional delay estimate 29 is then $\hat{\alpha} = -0.5$, which is passed to the interpolator 14.

Following the initial iteration of the interpolation feedback loop 35, the delay estimation and interpolation operation is continuously repeated to track the changes in the timing error.

Returning to interpolator 14, the finite interpolation of Equation 1 will now be described, including interpolator 14 processing a quantized fractional delay estimate 29 where $\hat{\alpha} \neq 0$, unlike when interpolator 14 initially processes the received signal 21. As seen from Equation 1, the ideal interpolation is an infinite length summation. For efficient interpolator implementation, a finite summation of Equation 1 must be performed. Equation 8a below shows this finite representation of output $\tilde{x}$ as follows:

$$\tilde{x}(n + \hat{\alpha}) = \sum_{m=-M_1}^{M_2} x(n - m) h_{\hat{\alpha}}(n) \quad \text{Equation 8a}$$

where $h_\alpha(n)$ represents interpolator coefficients, derived as follows:

$$h_{\hat{\alpha}}(n) = \operatorname{Sin} c(m + \hat{\alpha}) \quad \text{Equation 8b}$$

The frequency response of an ideal interpolator, which is an infinite length filter, is as follows:

$$S(\omega, \alpha T_S) = \begin{cases} T_S e^{j\omega \alpha T_S}, & |\omega/2\pi| < 1/(2T_S) \\ 0, & \text{otherwise} \end{cases} \quad \text{Equation 9}$$

An output signal error $E(\hat{\alpha})$ is defined as the difference between the ideal interpolator output and the finite representation of the interpolator as follows:

$$E(\hat{\alpha}) = \tilde{x}(n + \hat{\alpha}) - x(n + \hat{\alpha}) \quad \text{Equation 10}$$

Coefficients $h_\alpha(n)$ of an optimum FIR interpolator are determined by minimizing Equation 11, below, for all possible $\hat{\alpha}$ values for the quantized fractional delay estimate 29. The optimization method used is a minimum mean square error (MMSE) approach. Since the bandwidth $F=\omega/2\Pi$ of interest is smaller than $1/(2T_s)$, applying Parseval's relation to Equation 10 yields:

$$E^2(\hat{\alpha}) = \int_{-F}^{F} \left| e^{j\omega\alpha T_S} - \sum_{n=-M_1}^{M_2} h_{\hat{\alpha}}(n) e^{-j\omega n T_S} \right|^2 d\omega \quad \text{Equation 11}$$

Equation 11 is representative of an MMSE version of an FIR filter, which is the preferable type of interpolator for interpolator 14. Equation 11 has several different solutions. As an example, the Fletcher-Powell method can be used to solve Equation 11. It should be noted that the embodiments of the invention are not limited to any particular solution of Equation 11. The minimum error $E(\hat{\alpha})$ is achieved if $(M_I=M)$ and $(M_2=M-1)$ are selected for a total number of 2M coefficients. With coefficients found from Equation 12, optimum MMSE FIR interpolator 14 can be represented by the following equation:

$$\tilde{x}(n+\hat{\alpha}) = \sum_{m=-M}^{M-1} x(n-m) h_{\hat{\alpha}}(m) \quad \text{Equation 12}$$

As one skilled in the art knows, the interpolator coefficients are symmetrical around $\hat{\alpha}=0.5$, which can be written as $$h_{(1-\hat{\alpha})}(m) = h_{\hat{\alpha}}(-m-1) \quad \text{Equation 13}$$

As it is not feasible to solve for Equation 11 in real-time, Equation 11 is solved for all the possible $\hat{\alpha}$ values in advance, and the predetermined coefficients are stored in the look-up table of quantizer 19. This results in a look-up table of real number entries of size $M \cdot ((Q/L)-2)$, where Q/L is the number of quantizer levels. However, as $\hat{\alpha}=0$ results in no interpolation at all, it is excluded from the quantizer 19 look-up table. By using the symmetry property of Equation 13, the size of the look-up table can be reduced by half to $M \cdot ((Q/L)-2)/2$ real numbers. Alternatively, depending on the implemented interpolator structure, such as a polynomial interpolator, a look-up table may be omitted and replaced by real time computation.

In implementation, there are 2M number of coefficients $h_{\hat{\alpha}}(n)$ for $M \geq 1$, depending on the interpolation error that can be afforded. For example, a code tracker design for a 3GPP-like FDD compatible mobile WTRU receiver, including an early-late gate synchronizer, two times over-sampling (L=2), and a second-order loop filter including a PI filter cascaded with an accumulator as shown in FIG. 2, results in M=2 or total of four coefficients per quantizer level. For a required accuracy of $T_c/16$, (i.e., Q=16), the number of quantizer levels used is eight.

By optimizing the interpolation in accordance with the present invention, favorable results are achieved in reducing the timing error efficiently despite using a limited number of coefficients. Although the invention has been described in reference to multi-path fading channels and RAKE-like receivers, it should not be construed as limited to these applications. Alternative embodiments of code tracker 10 include, but are not limited to, having an interpolator among the following types: polynomial FIR interpolator, linear interpolator, and Lagrange interpolation.

What is claimed is:

1. A digital timing synchronizer of a receiver for timing synchronization to a transmitter in a wireless communication system, wherein the received signal has a timing error with respect to a reference code, comprising:
    a channel estimator configured for estimating an initial code phase of the received signal;
    a code generator configured to generate a timing reference code that is adjustable by integer increments; and
    an interpolation feedback circuit configured for interpolation and correction of the timing error, whereby the interpolation is achieved through an integer code shift, plus a quantized fractional delay estimate selected from a look-up table of quantized fractional delay estimate values and their associated predetermined interpolator coefficients, from which a time corrected version of the received signal is produced.

2. The invention of claim 1 wherein the interpolation feedback circuit further comprises:
    an interpolator normalized to a sampling rate, configured to shift the received signal in time by a fractional delay or advancement;
    a timing error estimator for determining timing error estimate based on timing difference between an output signal of the interpolation feedback circuit and the timing reference code;
    an interpolator controller responsive to the timing error estimate for producing and sending an integer code shift signal to the code generator in a direction opposite of the timing error estimate, producing a fractional delay estimate within a predetermined range for determining interpolation coefficients; and
    a quantizer having the look-up table with stored interpolator coefficients associated with predetermined quantized fractional delay estimate values, configured to select from the look-up table a quantized fractional delay estimate closest in value to the fractional delay estimate.

3. The invention of claim 2, wherein the interpolation feedback circuit further comprises a filter for filtering the timing error estimate to produce a delay estimate value with a sign opposite that of the timing error estimate, whereby the interpolator controller regulates the delay estimate within a predetermined operating range related to the timing error estimator configuration.

4. The invention of claim 3 wherein the interpolation feedback circuit further comprises a down-sampler responsive to the interpolator controller, configured to reduce the sampling rate of the received signal by an over-sampling factor and according to a base point related to the ratio of sampling rate of the received signal and the delay estimate.

5. The invention of claim 2 wherein the interpolator is an MMSE optimized FIR interpolator.

6. The invention of claim 1, wherein the received signal comprises multiple paths and the interpolation feedback circuit further comprises a post processing unit configured to process the estimated initial code phase and to estimate signal and noise power against a noise threshold, thereby producing an initial code phase to which the code generator develops the reference code.

7. The invention of claim 1 wherein the predetermined range for the fractional delay estimate is between (−1) and (1).

8. The invention of claim 1 wherein the received signal is over-sampled by a factor of L and the predetermined number of quantized fractional adjustment values is Q/L number of quantization levels, determined according to the desired timing accuracy T/Q for timing adjustment, where T represents the sampling period, Q represents a positive integer, and L is a positive integer.

9. A receiver including the digital timing synchronizer according to claim 1.

10. A wireless transmit/receive unit including the digital timing synchronizer according to claim 1.

11. A method for digital timing synchronization of a receiver to a transmitter in a wireless communication system, wherein the received signal has a timing error with respect to a reference code, comprising:
  estimating an initial code phase of the received signal;
  generating a timing reference code that is adjustable by integer increments; and
  interpolating and correcting the timing error, whereby the interpolating is achieved through an integer code shift, plus a quantized fractional delay selected from a look-up table of quantized fractional delay values and their associated predetermined interpolator coefficients, from which a time corrected version of the received signal is produced.

12. The method of claim 11 wherein the interpolating and correcting step further comprises:
  shifting the received signal in time by a fractional delay or advancement;
  determining a timing error estimate based on a timing difference between the time corrected version of the received signal and the timing reference code;
  producing an integer code shift signal in a direction opposite of the timing error estimate;
  producing a fractional delay estimate within a predetermined range for determining interpolation coefficients;
  storing, in a look-up table, predetermined quantized fractional delay estimate values associated interpolator coefficients; and
  selecting, from the look-up table, a quantized fractional delay estimate closest in value to the fractional delay estimate.

13. The method of claim 12, wherein the interpolating step further comprises filtering the timing error estimate to produce a delay estimate value with a sign opposite that of the timing error estimate, whereby the delay estimate is regulated within a predetermined operating range related to the timing error estimator configuration.

14. The method of claim 13 wherein the interpolating step further comprises reducing the sampling rate of the received signal by an over-sampling factor, according to a base point related to the ratio of sampling rate of the received signal and the delay estimate.

15. The method of claim 12 wherein the predetermined range for the fractional delay estimate is between (−1) and (1).

16. The method of claim 11, wherein the received signal comprises multiple paths and the interpolating step further comprises processing the estimated initial code phase and estimating signal and noise power against a noise threshold, thereby producing an initial code phase to which the code generator develops the reference code.

* * * * *

UNITED STATES PATENT AND TRADEMARK OFFICE
CERTIFICATE OF CORRECTION

PATENT NO. : 7,206,335 B2
APPLICATION NO. : 10/676152
DATED : April 17, 2007
INVENTOR(S) : Aykut Bultan It is certified that error appears in the above-identified patent and that said Letters Patent is hereby corrected as shown below:

ON THE TITLE PAGE

At section (56), page 2, OTHER PUBLICATIONS, left column, line 5, before the word "Interpolation", delete "F.M. Garner" and insert therefor --F.M. Gardner--.

At section (56), page 2, OTHER PUBLICATIONS, left column, line 11, before the word "Interpolation", delete "F.M. Gamer" and insert therefor --F.M. Gardner--.

At section (56), page 2, OTHER PUBLICATIONS, right column, line 8, before "et al.,", delete "R.e. Crochiere" and insert therefor --R.E. Crochiere--.

At section (56), page 2, OTHER PUBLICATIONS, right column, line 10, before "et al.,", delete "H. Myer" and insert therefor --H. Meyr--.

IN THE SPECIFICATION

At column 3, line 21, after the word "windows", delete "correlators" and insert therefor --correlator--.

At column 1, line 59, after the word "truncated", delete "sin c" and insert therefore --sinc--.

At column 1, line 66, after the words "lobe of the", delete "sin c" and insert therefore --sinc--.

At column 4, line 25, after the words "estimate 28, and the", delete "sin c" and insert therefore --sinc--.

At column 4, Equation 1, before " $\sum_{m=-\infty}^{\infty}$ " insert -- = --.

At column 4, delete Equation 2, and insert therefor --$\text{Sinc}(x) = \dfrac{\sin(\pi x)}{\pi x}$--.

UNITED STATES PATENT AND TRADEMARK OFFICE
CERTIFICATE OF CORRECTION

PATENT NO. : 7,206,335 B2
APPLICATION NO. : 10/676152
DATED : April 17, 2007
INVENTOR(S) : Aykut Bultan It is certified that error appears in the above-identified patent and that said Letters Patent is hereby corrected as shown below:

At column 4, line 35, after the word "formulation", insert --of--.

At column 9, Equation 11, before "– $\sum_{n=-M_1}^{M_2}$", delete "$e^{j\omega\alpha T_s}$" and insert therefor -- $e^{j\omega\hat{\alpha}T_s}$ --.

IN THE CLAIMS

At claim 12, column 12, line 4, before the word "associated", insert --and their--.

Signed and Sealed this

First Day of July, 2008

JON W. DUDAS
*Director of the United States Patent and Trademark Office*